D. WIEHL'S
Improvement in
VALVE SEATS.
No. 123,317.                      Patented Jan. 30, 1872.
Fig. 1.                  Fig. 2.
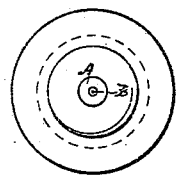 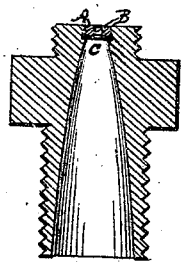
Fig. 3.
Witnesses:                      Inventor.
E. C. Wood                       Daniel Wiehl
R. J. Hyndman 123,317

UNITED STATES PATENT OFFICE.

DANIEL WIEHL, OF CINCINNATI, OHIO.

IMPROVEMENT IN VALVE-SEATS.

Specification forming part of Letters Patent No. 123,317, dated January 30, 1872.

I, DANIEL WIEHL, of Cincinnati, Hamilton county, and State of Ohio, have invented a new and useful Improvement in Valve-Seats, of which the following is a specification:

My invention relates to an improved method of constructing seats for valves and cocks where steam, water, or other fluids are used, which corrode, oxidize, or "gum," and prevent the proper working of the valve or cock stem in its seat; and consists in using agate or other precious stones which are non-corrosive, indestructible by the ordinary action of the elements, and to which the gummy deposit of steam will not stick, and which have, when properly finished, a smooth hard surface, which prevents any appreciable amount of friction by the working of the metal upon the seat.

The improvement is here shown as adapted to the seat of my "low-water indicator," patented July 5, 1870, No. 105,155, in which—

Figure 1 represents a plan view of the seat. Fig. 2 is a vertical section through the center of the valve-seat and steam-chamber. Fig. 3 is a perspective view of the stone used to form the seat.

A represents the seat formed of agate with the port or passage $b$, and is represented in Fig. 2 with a conical seat, C. The shape of the stone is conical, and is usually fixed in its proper position by being "burnished in." It may be fastened in any secure manner. It should be of sufficient area to form the seat of the valve, and of sufficient diameter to give the required strength for "burnishing-in," and for cutting or drilling its port or passage, which should be vertically through its center.

I consider agate the best stone to use, but any other stone which will, like agate, furnish a smooth surface of sufficient hardness not to cause any appreciable amount of friction by the working of metals upon its exterior and finished parts, and which will not cut or wear by the action of the metals when sand or sediment is in the water or fluid used, and which is not liable to corrosion or oxidation by the action of the water and its constituents, and which will not "gum" by the action of steam, may be used.

It is well known that in valve-seats where steam is used there is a gummy or viscous deposit which sticks the stem to its seat, and thus renders it practically useless. This is particularly the case with low-water indicators, the orifices of which are small, and the valves of which are under a pressure of steam and liable to become inoperative by a slight sticky deposit.

The object of my invention is to avoid this, and actual tests have demonstrated that the use of agate, as described, will accomplish this greatly-to-be-desired improvement.

Having thus described my invention, what I claim as new, and desire to secure by Letters Patent, is—

The seat for valves or other similar devices, formed of agate or other precious stones, when constructed substantially as and for the purpose herein set forth.

DANIEL WIEHL.

In presence of—
J. BODE,
E. E. WOOD.